April 15, 1941.   M. K. PATTEN   2,238,073
METHOD OF PRODUCING DISPLAY SIGN MATERIAL
Filed Nov. 18, 1938   3 Sheets-Sheet 1
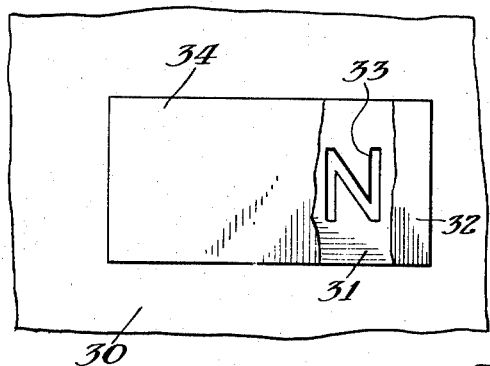
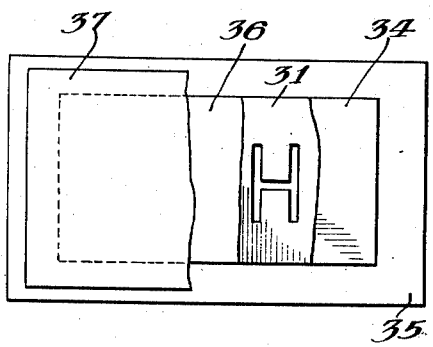
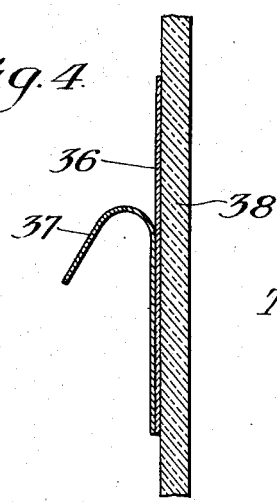
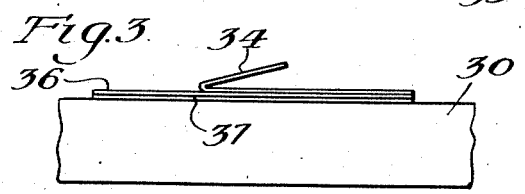
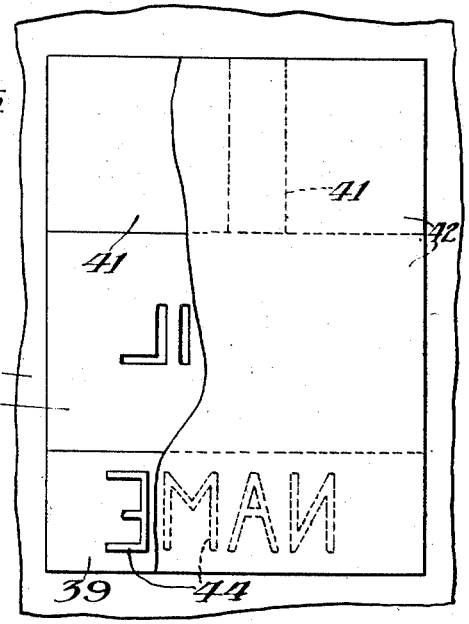
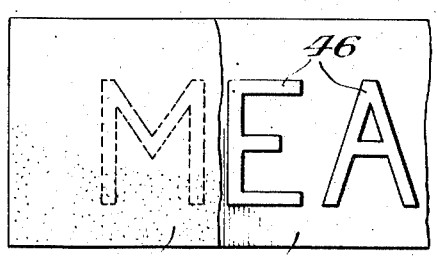
Inventor:
Murray K. Patten,
By: Zabel, Carlson, Fitzhugh & Wells
Attorneys April 15, 1941.   M. K. PATTEN   2,238,073
METHOD OF PRODUCING DISPLAY SIGN MATERIAL
Filed Nov. 18, 1938   3 Sheets-Sheet 2
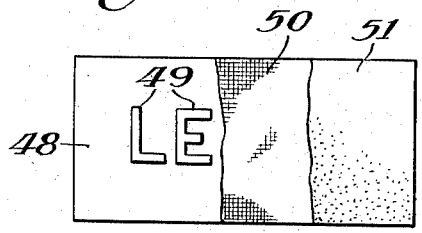
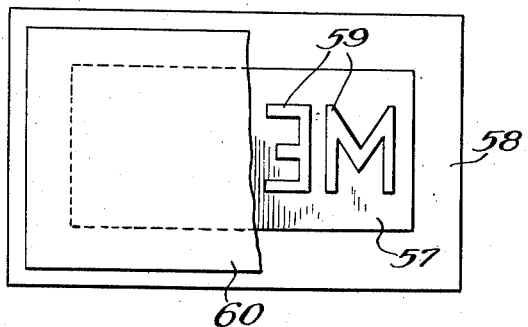
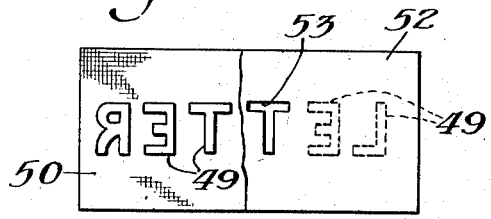
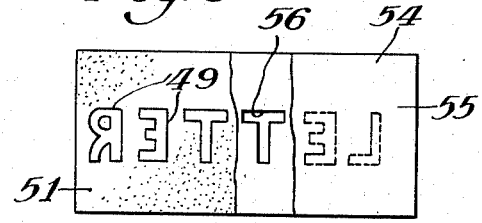
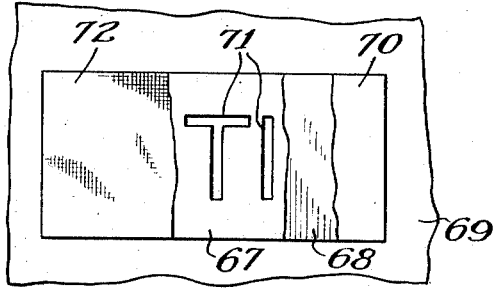
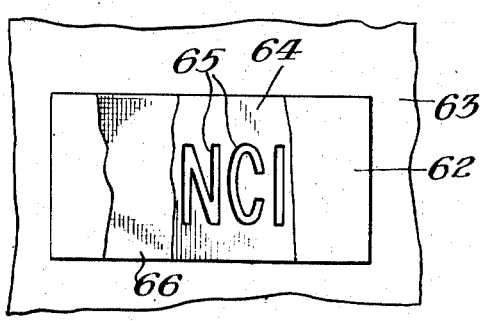
Inventor:
Murray K Patten,
By: Zahl, Carlson, Fulbright & Well
Attorneys April 15, 1941.　　　　M. K. PATTEN　　　　2,238,073
METHOD OF PRODUCING DISPLAY SIGN MATERIAL
Filed Nov. 18, 1938　　　3 Sheets-Sheet 3
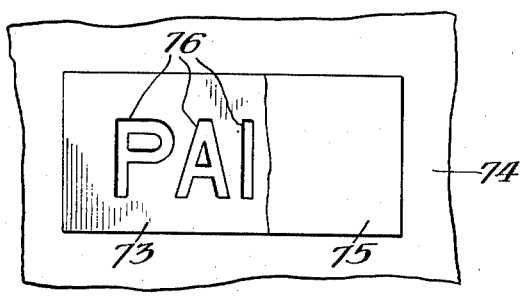
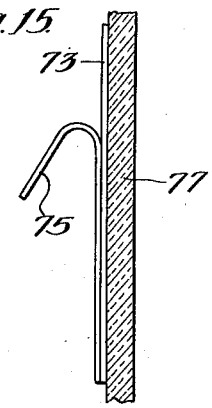
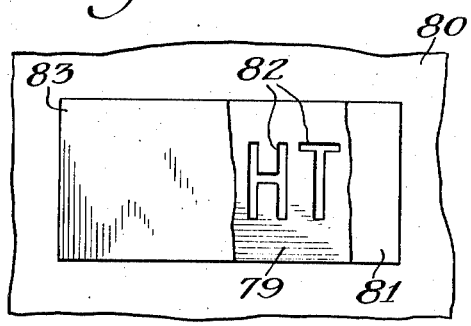
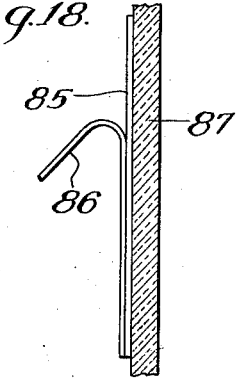
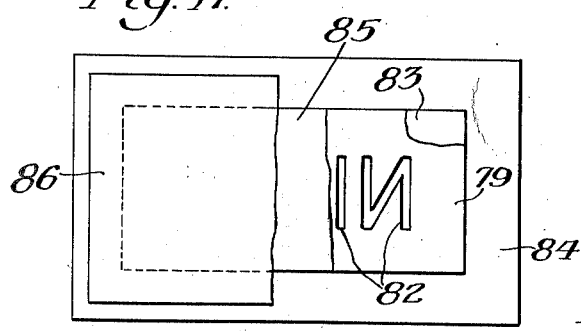
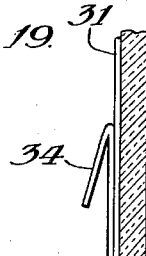
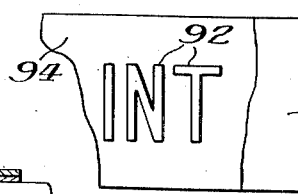
Inventor:
By: Murray K. Patten
Zabel, Carlson, Fitzhugh & Wells
Attorneys Patented Apr. 15, 1941

2,238,073

UNITED STATES PATENT OFFICE 2,238,073

METHOD OF PRODUCING DISPLAY SIGN MATERIAL

Murray K. Patten, Westchester, Ill.

Application November 18, 1938, Serial No. 241,182

14 Claims. (Cl. 41—33)

My invention relates particularly to painted display signs and to improved methods of producing them and attaching them permanently in position on a support. Some of the methods involved are applicable to uses other than in connection with display signs, and my invention relates accordingly to such other related matters.

My improved methods comprise the step of painting letters or other designs directly on the face of a flexible metal foil, and then, after the paint film has dried, stripping off the foil and applying the film to a window or other piece of glass or to some other suitable support, such as a truck body, for example. It is well known that when a film of high grade paint or varnish or lacquer has been applied in liquid form on the face of a piece of metal foil and dried thereon, such film is very strongly bonded to the foil so as to be adapted to adhere to the foil under normal conditions for a long period of years. I have found, however, that if a foil having a film of paint dried thereon be supported on a table or panel with the film next to the panel the foil can be readily stripped from the film by being drawn backwardly upon itself at a sharp angle, this result being effected without injuring the paint film in any way. So far as I am aware, I am the first in the art to prepare a film of paint or varnish or lacquer by applying it by a wet painting operation on the face of a metal foil and then after the film has dried stripping the foil from the film. So far as I am aware, I am the first in the art to prepare a composite film of paint or varnish or lacquer by first applying on a portion of the face of a metal foil a film of the material in either wet or pre-dried form, then by a wet painting process applying a second film of such material on the face of the metal foil in edge to edge contact with the first-applied film portion so as to be in effect integrally connected therewith when dried, and then after the drying of the film stripping the foil from the film.

When a composite film is formed in this manner with adjacent film portions overlapping, it is likely that the film will be of different thicknesses at different points, but in any such case the faces of the adjacent film portions are always precisely flush with each other at the face of the foil so as to present a perfectly smooth and even conformation without shoulders or other unevenness at the surface from which the foil is removed.

I have found that when a film of paint or varnish is thus formed in the shape of letters or other designs, or in the shape of a plain sheet, such film can be very securely attached to a piece of glass or other smooth solid support by merely rubbing it down smoothly on the support with water so as to insure the removal of all air or other extraneous matter, a permanent bond being developed in the course of a fairly short time by which the film is securely held in position.

My improved methods comprise also the formation of a sign or the like including a preformed decalcomania, for example, in which the decalcomania is caused to unite in substantially integral form with the adjacent portions of the sign, or by which a plurality of preformed decalcomanias or other paint film portions are united together either with or without additional display subject matter. This result is attained preferably by placing the decalcomanias or other preformed paint film products in position upon a piece of metal foil and painting between and around the decalcomanias so as to bind them to the foil, the foil being stripped from the composite paint film after the complete drying of the assembly.

My improved methods relate also to the production and use of silk screen stencils, either in connection with my other improvements or otherwise. The invention includes also improved methods of handling pieces of foil, pieces of paper, or other parts which it is desired to attach releasably together for carrying out my improved methods, by which a water sealing effect is utilized for holding the parts temporarily in position. I have found that such a method of temporarily securing parts in position is very convenient, particularly in that there is no tackiness to be combated and in that the parts can be manipulated and shifted without limit for adjusting them to their desired positions without destroying their tendency to be held securely in their finally adjusted positions.

My invention relates also to other features of improvement as hereinafter set forth. The preferred methods as worked out by me are explained in connection with the accompanying drawings. In the drawings, many of the parts are broken away at one portion so as to enable the layer or layers underneath in the assembly to be seen. The thickness of the parts is also exaggerated in many instances, the drawings being more or less diagrammatic for clearness of illustration.

In the drawings—

Fig. 1 illustrates an intermediate assembly of parts in position on a table in the course of the formation and attachment of a sign to a support;

Fig. 2 illustrates a second intermediate assembly of parts in position on a panel in the course of the same operation as shown in part in Fig. 1;

Fig. 3 illustrates the step of removing a foil from a film painted on the foil, being a step in the operation illustrated in part in Figs. 1 and 2 and likewise a step in many of the hereinafter described operations;

Fig. 4 illustrates the application of the completed sign to a window;

Fig. 5 illustrates the assembly involved in the connection of a plurality of decalcomanias and other display subject matter into the form of a single integral paint film;

Fig. 6 illustrates the assembly employed in connection with the formation of a film with a plurality of preformed letters or other patterns held in position thereby ready for application to a window or the like;

Figs. 7 and 8 illustrate related assemblies employed in the formation of a silk screen stencil and involving the use of preformed letters or other patterns;

Fig. 9 illustrates an assembly developed in connection with that shown in Fig. 7 whereby a sign or the like is provided by the use of a silk screen and preformed letters or other patterns;

Figs. 10 and 11 illustrate related assemblies employed in connection with the production of a sign and its attachment to a support such as a window by the use of preformed letters or other patterns and without the use of a silk screen;

Fig. 12 illustrates an assembly for use in the production of a silk screen stencil by cutting a design directly in a metal foil;

Fig. 13 illustrates an assembly for use in the production of a slightly different form of silk screen stencil by cutting the design directly in the foil;

Figs. 14 and 15 illustrate assemblies by which a design is cut directly in a foil and employed for painting a sign therewith directly on a window or other support;

Figs. 16, 17 and 18 illustrate assemblies by which a sign is formed and placed on a support such as a window, involving the step of cutting a design directly in a foil and involving the production of the sign in the form of a transfer which can be applied easily at the job after substantially all the work has been done at the shop;

Fig. 19 illustrates an assembly developed in connection with that shown in Fig. 1 involving the cutting of a design directly in the foil preparatory to painting a sign directly on a window; and Fig. 20 illustrates an assembly involving the connection of two paint films of different colors into substantially integral form by painting one layer on a foil directly on top of the edge portion of a previously painted and dried paint film so as to provide flush face portions at the display face when the foil is later stripped from the film; and Fig. 21 illustrates a modified form of sign or poster to be secured in display position in a novel manner.

Referring now particularly to Figs. 1 to 4 of the drawings, 30 indicates a table upon which a piece of metal foil 31 is secured by means of a piece of water-soaked paper 32, the foil being secured in position by being rubbed down smoothly on the paper and table so as to be held by a water seal. The foil 31 is provided with a design 33 cut therein after the foil is secured on the table, the design being in the form of a word, one letter of which is visible in Fig. 1, the cut portion of the foil being removed. A second metal foil 34 is secured by a water seal upon the stencil foil 31. After the assembly is formed as shown in Fig. 1, it is released from the table and is rubbed down with water in inverted position upon a sheet metal plate or panel 35, with the second foil 34 next to the panel. The piece of paper 32 is then stripped from the assembly and paint of one color is applied through the design of the stencil. Thereafter, and preferably after the initial layer of paint has almost completely dried, the stencil foil 31 is stripped from the assembly and a second coat of paint of a different color is placed on top of the dried paint so as to cover the base foil 32. The paint film is indicated in Fig. 2 by the numeral 36. After the assembly has completely dried, a water-soaked paper 37, preferably, is secured in position by means of water-soluble glue, with its margins extending beyond the assembly so as to engage the panel 35. When the paper has dried, its margin portions are cut off for releasing the assembly from the panel, and the assembly is inverted into the position as shown in Fig. 3. The base foil 34 is then turned backwardly upon itself at a sharp angle and thus stripped from the paint film 36, this being accomplished without injuring the paint film in any way. The paint film 36 and paper backing sheet 37 are then soaked in water for some little time so as to permit the paint film to absorb a supply of water, whereupon the assembly is applied in its display position upon a window 38, as shown in Fig. 4. the film being rubbed down very carefully upon the glass so as to force out any air or water which may have been trapped. The paper 37 is then stripped from the face of the film 36, after which a coat of varnish may be applied over the back of the sign at the left in Fig. 4 if desired.

I have found that when a film such as 36 is rubbed down with water upon a smooth solid support such as the glass 38, the film in the course of several hours assumes a strongly bonded relation to the glass such as to cause it to adhere as strongly as if the film had been painted directly on the glass. This is caused by the gradual diffusion of the water molecules of the water film through the imprisoning paint film due to the higher vapor pressure of the water film with respect to normal atmospheric vapor pressure. As the water molecules depart, atmospheric pressure forces the pliable paint film particles into the pores of the surface 38 to take the place of the water and a permanent bond between the film 36 and the glass 38 is thus established. Inasmuch as the face of the film which was formed next to the base foil is the face which is applied against the glass 38, it will be appreciated that there is no break in the contact between the film and the glass, with the result that an effective bond is assured.

In the preparation of a sign by the use of the means shown in Fig. 5, I first secure a sheet of metal foil 39 upon a table 40 by means of a water seal. I then place one or more decalcomanias 41 in position upon the foil 39, the paper and the gelatin having been removed from the decalcomanias which are then rubbed down with water upon the foil with their display faces against the foil. The decalcomanias 41 are arranged in spaced relation to each other, and at least a portion of the margin of each of the decalcomanias is arranged inside of the margin of the proposed sign as defined ordinarily by the size of the foil 39. A layer of paint or varnish is then applied upon the inside margin portions of the decalcomanias and on the adjacent face portions of the foil 39, such layer of paint in the arrangement shown being indicated by the reference character 42. If desired, a stencil 43 may be employed at a portion of the face of the sign alongside of the decalcomanias 41, being held in place on the foil by a water seal, the portion of the paint film 42 at the part of the foil upon which the stencil 43 is located being applied in two or more layers by successive painting operations, the stencil being removed in the course of the painting operation and the paint film being continuous and unbroken over the stencil portion of the sign. For applying the name of a dealer, or the like, in connection with the sign, I have employed a plurality of preformed metal foil letters 44 which are secured in position by a water seal upon the face of the foil 39 in appropriate position, the paint film 42 being applied directly over such preformed letters. After the paint film has dried, the decalcomanias 41, the metal foil letters 44, and the additional sign subject matter prepared by the use of the stencil 43 are all connected together by the paint film which is preferably continuous and coextensive with the foil 39. The paint film 42 serves effectively to hold the foil letters 44 in position, and is connected by substantially an integral bond with the decalomanias. After the complete drying of the paint film, a paper backing may or may not be applied by means of a water seal or otherwise, but whether or not the paper backing is applied the assembly is released from the table and the foil 39 is stripped from the face of the sign. The foil is of course very readily detachable from the face portions of the decalcomanias and the face portions of the preformed letters 44, and is stripped from the painted portions of the sign in the same manner as is described above in connection with the foil 34 as shown in Fig. 3. In the final product, the display face of the composite sign comprising the decalcomanias, the preformed letters, and the paint film, is smooth and even throughout with the display face portions all precisely flush with each other.

In the arrangement of parts as shown in Fig. 6, I provide a metal foil 45 held in position upon a table or otherwise and apply upon the face of the foil one or more letters or other patterns 46 formed of metal foil or other suitable material, such patterns being preferably secured in position by a water seal. Over the letters 46, I apply a layer of gelatin 47, and after the gelatin has dried I strip the base foil 45 from the assembly, leaving the pattern or patterns 46 held in position by the layer of gelatin 47 ready for application to the face of a window or other suitable support.

Referring now to Figs. 7 and 8, which illustrate a different combination of cooperating parts, 48 indicates a piece of metal foil which is secured upon a table or other support by means of a water seal or otherwise so as to be in position to receive a plurality of preformed letters or other patterns 49 made preferably of metal foil, such patterns being secured upon the base foil by means of a water seal. The base foil 48 is then loosened from the table or other support and a silk screen 50 is placed in position over the letters. A layer of gelatin 51 is then applied over the letters and the foil by being charged through the silk by means of a squeegee, after which the assembly is permitted to dry and the base foil 48 is stripped backwardly upon itself at a sharp angle out of contact with the letters and the gelatin, leaving the letters secured in position upon the silk by the gelatin. The gelatin as exposed about the letters on the assembly is then removed, preferably by moistening the assembly by means of a cotton ball soaked with water, and the assembly is again dried. After the removal of the gelatin, a layer of lacquer 52 is applied over the letters upon the silk, the letters being removed after the layer of lacquer has partially set but before it is completely dried, as is indicated by the opening 53 in the lacquer 52 from which a letter has been removed. The remaining portions of the gelatin are then washed out of the screen, whereupon the screen is ready for use as a stencil for the formation of signs as is readily understood.

In Fig. 9, I have illustrated means by which a slightly different process is carried out. With the assembly formed as above described in connection with Fig. 7, with letters 49 held in position upon a silk screen 50 by means of a layer of gelatin 51, I apply a layer of paint 54 over the entire face of the assembly on top of the gelatin and the letters 49, and remove the letters 49 before the complete drying of the layer of paint, as indicated at 56 in said Fig. 9. After the paint is dry, I apply a second layer of paint 55 of a different color over at least the portion of the first layer in which the letter openings 56 are found, such second layer of paint being applied directly upon the gelatin. After the complete drying of the assembly, the screen is moistened so as to soften the gelatin for loosening the paint film from the silk screen. The paint film would be reinforced by a backing sheet before its detachment from the silk if desired, or it might be handled without such reinforcement. The operation in connection with the parts as shown in Fig. 9 is effective for producing only a single sign as compared with the production of a stencil as shown in Fig. 8 capable of use for producing many signs.

In Figs. 10 and 11, I have shown the means for preparing a single sign without using a silk screen and without the necessity for using paint for the production of the sign. In the preferred method, I apply a piece of foil 57 upon a steel plate or panel 58, the foil being secured in position by a water seal. Upon the foil 57, I secure a plurality of letters or other preformed patterns 59 which are secured in the desired spaced relation by means of a water seal. Over the foil and patterns 59, I mount a piece of gelatinized paper 60 in moist condition with its margins extending half an inch beyond the base foil 57 so as to be secured directly upon the panel 58. After the assembly has dried, the gelatinized paper is loosened from the plate, preferably by cutting the extending margins of the paper, and the foil 57 is stripped from the face of the paper, leaving the letters or other patterns 59 held in position by the gelatin on the paper. The assembly is then moistened and rubbed down upon a piece of glass 61 with the letters next to the glass, whereupon the paper is stripped from the letters, leaving the letters permanently held in position by a water seal upon the glass 61.

By the use of the arrangement as shown in Fig. 12, I have provided an improved silk screen stencil. I first secure a piece of water-soaked paper 62 upon a table 63 by rubbing it securely into contact therewith, and then secure a piece of metal foil 64 by a water seal upon the paper. I then cut a design in the foil 64, cutting entirely through the foil but not entirely through the paper, the design in the arrangement shown in Fig. 12 comprising a plurality of letters 65, the cut-out portions of the foil being removed. A piece of silk 66 is then placed over the stencil foil, and a layer of paint is pressed through the silk by means of a squeegee so as to secure the silk to the stencil. The assembly is then removed from the table and the base paper 62 is stripped off, leaving the stencil held in position on the silk by the layer of paint, with the stencil ready for use for the preparation of any desired number of copies in accordance with methods well understood.

When the stencil is to be stored for future use, a piece of foil is preferably applied by means of a water seal upon the face of the stencil which is then loosened from the screen by the application of turpentine thereto, the connected stencil foil and protecting foil being rubbed down upon a steel plate for storage. For remounting the stencil upon a silk screen for repeated use, the two pieces of foil are stripped off the steel plate and are placed against the silk screen with the stencil foil inside. Thereupon a layer of paint is forced through the silk by means of a squeegee for securing the stencil in position and the protecting foil is pulled off leaving the assembly ready for use.

For preparing a stencil by the means as shown in Fig. 13, a layer of lacquer 67 is applied in any suitable manner upon a piece of foil 68 and the foil is rubbed down upon a table 69 with a water-soaked strip of paper 70 interposed between the foil and the table so as to secure the foil in position by a water seal with the layer of lacquer facing upwardly. A design is then cut in the lacquer covered foil 68 so as to cut entirely through the foil but not through the paper, the design in the arrangement shown comprising a plurality of letters 71, the cut-out portions being removed. A piece of silk 72 is then placed in position upon the layer of lacquer and is secured in position by moistening the lacquer through the silk by means of a lacquer-soluble agent, after which the assembly is removed from the table and the paper 70 is pulled off, leaving the foil 68 held in position by the lacquer ready for use.

For preparing a stencil by a simple process for painting a sign directly upon a window, for example, I secure a piece of metal foil 73 upon a table 74 with a water-soaked piece of paper 75 interposed between the foil and the table (see Figs. 14 and 15) and then cut a design therein, the design as shown in Fig. 14 comprising a plurality of letters 76 with at least a portion of the cut-out foil removed. The assembly is then released from the table and is moistened and rubbed down upon a piece of glass 77, after which the paper 75 is pulled off, leaving the stencil foil 73 mounted upon the glass. A sign is then painted directly upon the glass by the use of the stencil by a succession of painting operations as is fully understood by those skilled in the art.

A different arrangement of parts for use for painting a sign directly upon a window or other piece of glass is shown by Figs. 1 and 19. In the use of this means as shown in said two figures, a foil 31 is secured upon the table 30 by means of a water seal with the water-soaked paper 32 intervening, after which a design 33 is cut in the foil and at least a portion of the cut-out foil is removed. A second piece of foil 34 is then secured by means of a water seal upon the stencil foil 31, after which the assembly is removed from the table and the paper base 32 is pulled off, leaving the two foils 31 and 34 held together by a water seal. The two foils are then moistened and rubbed down upon a window 78, as shown in Fig. 19, with the stencil foil 31 next to the glass, whereupon the base foil 34 is stripped from the foil 31. The sign is then painted upon the glass 78 by the use of the stencil by one or more painting operations as may be desired.

When it is desired that a painted sign be applied upon a window, for example, at a considerable distance from the shop of the operator, a different procedure would be followed. By the use of the parts as shown in Figs. 16, 17 and 18, I have provided a sign in the form of a transfer which can be prepared complete at the shop and secured quickly and easily upon a window by a minimum of operations at the job. For this purpose, I secure a piece of metal foil 79 upon a table 80 by rubbing it down firmly on the table with a piece of water-soaked paper 81 intervening, after which I cut a design in the foil without cutting through the paper, the design as shown in Fig. 16 comprising a plurality of letters 82. A base foil 83 is then moistened and rubbed down upon the stencil foil 79, after which the assembly is loosened from the table and rubbed down with water on a sheet metal plate 84 with the base foil 83 next to the panel. The paper 81 is then pulled off the assembly whereupon a layer of paint 85 is applied on the base foil comprising one or more coats of the paint, the final coat being applied over the entire face of the base foil 83 after the removal of the stencil foil. After the assembly including the paint 85 is dry, a water-soaked piece of paper 86 is secured upon the paint by means of a water-soluble glue, with margins extending beyond the paint into engagement with the panel 84. After the assembly again has dried, the paper is released from the panel, preferably by cutting off the margin portions of the paper, whereupon the assembly is released from the panel and the base foil 83 is stripped from the face of the layer of paint 85. In this condition, the assembly can be stored for future use or can be carried to any desired point of use. For application upon a window 87, the face of the glass is moistened and the paint film is rubbed down firmly thereon, the paint film 85 being first preferably soaked in water until it has absorbed a considerable quantity of water. Whether the film 85 is first soaked in water or not, the film is very carefully smoothed on the glass so as to remove any water or air bubbles between the parts, after which the paper 86 may be stripped from the layer of paint. I have found by practice that when a paint film is secured in this manner upon a piece of glass or upon some other smooth solid surface, the film is bonded very strongly to the support so as to resist any normal tendencies for the removal of the film from the support.

In Fig. 20, I have shown a table 88 having a piece of metal foil 89 secured thereon by means of a water seal or in any other suitable manner. Upon the face of the foil 89 there is a layer of paint 90 applied upon the foil and dried in position thereon, together with a second layer of paint 91 of a different color applied later over the layer 90 and engaging the foil alongside of said layer 90. I have found that when a second layer of paint is applied under such circumstances in contact with a layer already in position, the initial layer is softened somewhat by the solvent of the second layer of paint with the result that the two layers of paint are connected into substantially integral form with respect to each other, the faces of the two layers next to the foil 89 being of course precisely aligned and flush with each other, as was explained above in connection with the arrangement shown in Fig. 5 involving the use of decalcomanias.

Fig. 21 shows a novel form of sign or poster to be mounted securely but removably in display position. The sign as illustrated comprises a plurality of letters 92 preferably painted by the use of a stencil or otherwise upon a piece of metal foil 93, the sign including preferably a layer of paint 94 serving as a background upon the foil coextensive with the foil. After the sign has dried, the assembly is to be rubbed down with water upon a glass, or other smooth hard surface, such as the side face of a truck body, for example. I have found that the water seal thus established is effective for holding the assembly very securely in position so as to resist any tendency of the sign to be shaken loose or to become dislodged under normal conditions, while at the same time the sign is capable of being removed with comparative ease when a pull is applied directly upon the foil for stripping it from the support. The sign is accordingly very satisfactory for use on a truck body, say, where it is many times desired to change the copy at fairly frequent intervals.

I have not attempted to present an exhaustive explanation as to the methods available for practicing the novel features set forth above. Many auxiliary cooperative steps will occur to those skilled in the art. For example, it is clear that a sign might be produced upon a piece of metal foil by almost any known system of printing or lithographing and that such printing when combined with a strengthening layer of paint or varnish will remain intact in position on the paint film when the foil is stripped off after the complete drying of the sign. It will be appreciated also that I have not distinguished closely between paint and varnish in the description as set forth herein, either paint or varnish being serviceable in many of the applications as described, the term varnish being used to include lacquer. The expression paint or varnish like covering material is used in the specification and claims to refer to materials which dry into the form of a film in which the particles making up the film have a fairly strong bond with each other so as to give the film a degree of strength independently of the support upon which it is dried, as distinguished from materials such as gelatin or other weak adhesives, whitewash, kalsomine or the like, a thin film of which as applied ordinarily for covering or cementing purposes has little or no strength in and of itself independently of the support on which it is applied. I desire to have the claims interpreted as broadly as possible consistent with their being held valid over the prior art and being distinguished from each other without too close regard to the phraseology with respect to unessential details.

While I prefer to employ the means and processes as described above, it is to be understood that my invention is not limited to the details of arrangement and the details of procedure as set forth except so far as the claims may be so limited, it being understood that changes might well be made without departing from the spirit of my invention.

I claim:

1. A new method of manufacturing comprising applying on the face of a piece of metal foil a layer of paint of varnish like covering material adapted to harden into continuous homogeneous form, and then after the material has hardened separating the foil from the hardened material by stripping the foil backwardly upon itself at a sharp angle.

2. A new method of manufacturing comprising applying on the face of a piece of metal foil in close contact therewith a film of paint or varnish like covering material, then applying by a wet painting process a second film of paint or varnish like covering material in edge to edge contact with the first-applied film portion so as to be substantially integral therewith when dried, and then separating the foil from the dried composite film by stripping the foil backwardly upon itself at a sharp angle.

3. A new method of manufacturing comprising forming a product in sheet form on the face of a piece of flexible metal foil from a water-insoluble material adapted to be spread readily on the foil and adapted when so spread to dry into the form of a flexible film firmly bonded to the foil, and then after the material has dried separating the foil from the film by stripping the foil backwardly upon itself at a sharp angle.

4. A new method of manufacturing comprising forming a product in sheet form on the face of a piece of flexible metal foil from a paint or varnish like covering material adapted to be spread readily on the foil and adapted when so spread to dry into the form of a flexible film firmly bonded to the foil, reinforcing and stiffening the film somewhat by causing a backing sheet to adhere releasably to the face of the foil, then separating the foil from the reinforced film by stripping the foil backwardly upon itself at a sharp angle, and then separating the backing sheet from the film.

5. A new method of manufacturing comprising applying a layer of colored paint or varnish like covering material on a portion of the face of a piece of flexible metal foil for forming a film thereon, then applying a layer of paint or varnish like covering material of a different color on the adjacent portion of the face of said foil for forming a film thereon, with the film portions of different color substantially continuous and integral with each other and with their face portions next to the foil precisely aligned flush with each other and bonded firmly to the face of the foil, and then separating the foil from the film by stripping the foil backwardly upon itself.

6. A new method of manufacturing comprising painting adjacent portions of the face of a thin metal foil with different colors of paint or varnish like covering material so as to form on the foil overlapping films integrally connected to each other and of any desired number of successive layers for giving the desired thickness and strength, and then separating the foil from the film by stripping the foil backwardly upon itself after the film is thoroughly dried.

7. The method of making a display sign, comprising securing a display face element in the form of a film face downwardly in position upon a piece of metal foil so as to be readily detachable therefrom and with at least a portion of the margin of said element located inside of the margin of the proposed sign, applying a layer of paint or varnish like covering material adapted to dry in air on the foil adjacent to said display face element so as to cover at least the inside margin portion of said element and to form a complementary film bonded to the foil and to the element about said inside margin portion with the faces of the films flush with each other on the face of the foil, and then separating the foil from the film and connected display face element by stripping the foil backwardly upon itself.

8. The method of making a display sign, comprising securing at least one decalcomania face downwardly upon a piece of metal foil so as to be readily detachable therefrom and with at least a portion of the margin of the decalcomania located inside of the margin of the proposed sign, applying a layer of paint or varnish like covering material on the foil adjacent to said decalcomania so as to cover at least the inside margin portion of the decalcomania and to form a film bonded to the foil and connected substantially integrally with the decalcomania about said inside margin portion, and then separating the foil from the film and connected decalcomania by stripping the foil backwardly upon itself.

9. The method of making a display sign, comprising securing at least one decalcomania face downwardly upon a piece of metal foil so as to be readily detachable therefrom and with at least a portion of the margin of the decalcomania located inside of the margin of the proposed sign, then painting in additional sign subject matter on the foil alongside of the decalcomania and extending such painted layer over at least the inside margin portion of the decalcomania so as to form a film bonded to the foil and connected substantially integrally with the decalcomania about said inside margin portion, and then separating the foil from the film and the connected decalcomania by stripping the foil backwardly upon itself.

10. A new method of manufacturing comprising securing a base sheet of metal foil by means of a water seal to a metal foil stencil, then painting by successive steps on the base foil by the use of the stencil and involving the removal of the stencil, then when the paint film has dried applying a water-soaked sheet of paper on the face of the film and drying it smoothly thereon, and then separating the base foil from the paint film by stripping the foil backwardly upon itself at a sharp angle.

11. A new method of manufacturing comprising applying a layer of paint or varnish like covering material on the face of a piece of flexible metal foil, then after the material has dried into the form of a continuous homogeneous film firmly bonded to the foil securing a paper backing sheet to the face of the film by means of water-soluble glue, then separating the foil from the film by stripping the foil backwardly upon itself at a sharp angle, then securing the film firmly to the face of a support, and then stripping off the paper from the face of the film.

12. A new method of manufacturing comprising rubbing down a piece of metal foil on a table with a piece of water-soaked paper between the foil and the table, then forming a stencil by cutting a design in the foil, removing at least a portion of the cut-out foil, then securing a second piece of metal foil by water seal on the stencil foil, then removing the assembly from the table and securing it by a water seal on a hard panel with said second foil next to the face of the panel, then stripping off the paper and applying paint or varnish like covering material on the face of said second foil by successive steps employing successively different colors and involving the complete removal of the stencil prior to the application of the final coat of covering material, and then removing the assembly from the panel after the paint film has dried and separating said second foil from the paint film by stripping the foil backwardly upon itself at a sharp angle.

13. A new method of manufacturing comprising rubbing down a piece of metal foil on a table with a piece of water-soaked paper between the foil and the table, then forming a stencil by cutting a design in the foil, removing at least a portion of the cut-out foil, then securing a second piece of metal foil by water seal on the stencil foil, then removing the assembly from the table and securing it by a water seal on a hard panel with said second foil next to the face of the panel, then stripping off the paper and applying paint or varnish like covering material on the face of said second foil by successive steps employing successively different colors and involving the complete removal of the stencil prior to the application of the final coat of covering material, then securing a water-soaked piece of paper by means of water-soluble glue on the face of the paint film and panel so as to cause it to dry smooth thereon, then removing the assembly from the panel and separating the second foil from the paint film by stripping the foil backwardly upon itself at a sharp angle, then soaking the assembly in water for allowing the paint film to absorb a supply of water, then rubbing the assembly down on the face of a piece of glass for securing it by a water seal thereon, and stripping the paper from the paint film and the glass.

14. A new method of manufacturing comprising applying on a piece of metal foil a plurality of complementary film portions of paint or varnish like covering material flush with each other and in contact so as to be substantially integral when dry, then separating the foil from the dried composite film by stripping the foil backwardly upon itself at a sharp angle, then soaking the film thoroughly for causing the absorption of a substantial amount of water, and then rubbing the film down on the face of a piece of glass for securing the film by a water seal on the glass.

MURRAY K. PATTEN.